Dec. 24, 1940.　　　　H. A. S. HOWARTH　　　　2,225,835
BEARING
Filed Dec. 29, 1937　　　　2 Sheets-Sheet 1

Inventor
Harry A. S. Howarth

By Cameron, Kerkam + Sutton
Attorneys

Dec. 24, 1940.　　　H. A. S. HOWARTH　　　2,225,835
BEARING
Filed Dec. 29, 1937　　　2 Sheets-Sheet 2
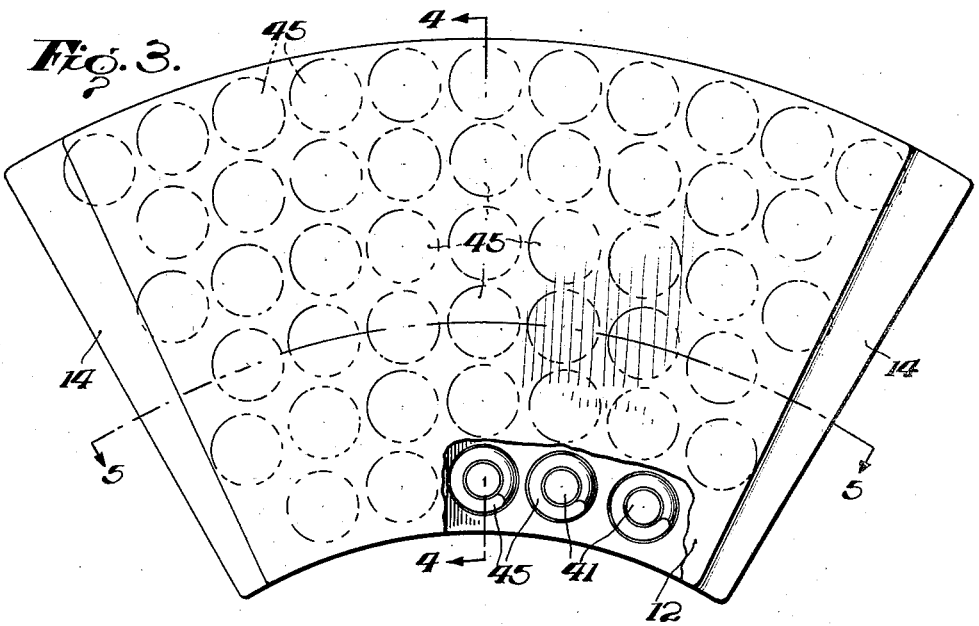
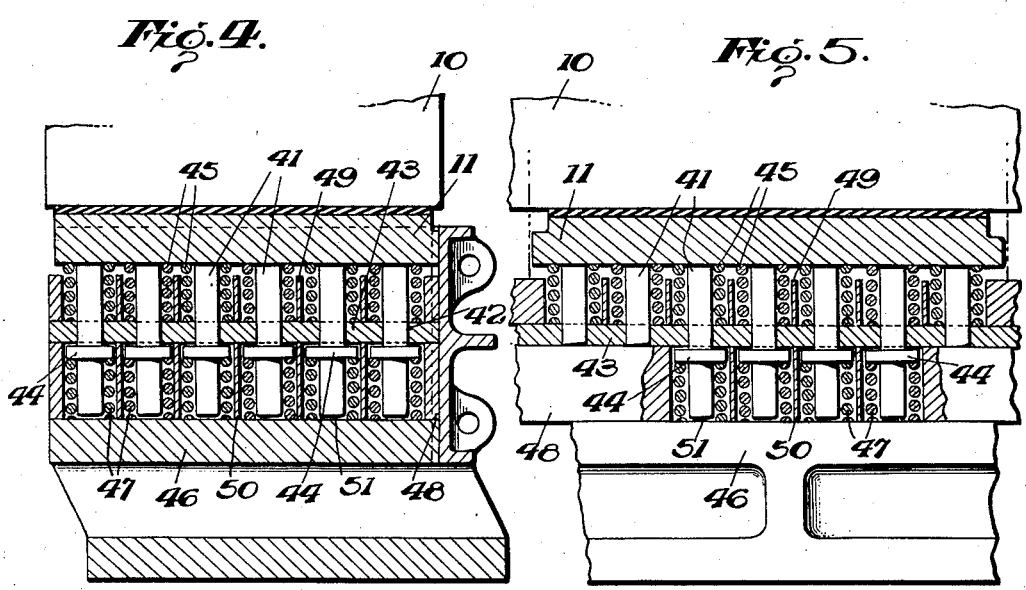
Inventor
Harry A. S. Howarth
By Cameron, Kerkam + Sutton
Attorneys Patented Dec. 24, 1940

2,225,835

UNITED STATES PATENT OFFICE 2,225,835

BEARING

Harry A. S. Howarth, Philadelphia, Pa., assignor to Kingsbury Machine Works, Inc., Philadelphia, Pa., a corporation of Delaware Application December 29, 1937, Serial No. 182,363

10 Claims. (Cl. 308—160)

This invention relates to bearings, and more particularly to bearings wherein elastic means are interposed between one or more of the bearing members and the support or abutment for the same. While the invention is of particular utility when applied to a thrust bearing, and will be described with particular reference to its use in a thrust bearing, it is to be expressly understood that in its broader aspects the present invention is not restricted thereto.

It has heretofore been proposed to interpose elastic means between a bearing member and its support or abutment so that the bearing pressure will be equitably distributed over the bearing surfaces. It is an object of this invention to provide a bearing of the type characterized wherein the capacity of the elastic support may be increased, thereby overcoming one of the recognized defects or deficiencies in prior spring supported bearings.

Another object of this invention is to provide a bearing of the type characterized wherein the elastic resistance to displacement of the bearing members may be so distributed as to produce the proper reaction to the load when a predetermined oil film is established.

Another object of this invention is to provide a device of the type characterized wherein the elastic support is so constructed as to minimize the bearing members being set into vibration, either by external forces or because of any irregularity in the bearing structure.

Another object of this invention is to provide a bearing of the type characterized in which may be incorporated the principles of operation and advantages disclosed in the patent of Albert Kingsbury, No. 1,754,324, granted April 15, 1930, wherein the elastically supported bearing member or members also function in the manner of a dashpot to dampen vibrations and wherein two or more elastically supported bearing members functioning as dashpots are so interrelated that a progressive compression or expansion of the elastic means will not produce undesired axial displacements or vibratory movements of the bearing members.

Another object of this invention is to provide a bearing of the type characterized which includes means that positively prevent excessive movement of the elastically supported bearing member or members.

Another object of this invention is to provide a bearing of the type characterized with improved means for controlling any tendency of the bearing member or members to be set into vibration or to have excessive displacement in an axial direction.

Another object of this invention is to provide a bearing of the type characterized with means for increasing the capacity of the elastically supported bearing member or members to effect an equitable distribution of pressure or load on said member or members.

Another object of this invention is to provide a bearing of the type last characterized which is so constructed as to facilitate the desired distribution of the elastic means in order to obtain the desired action of the same in effecting equitable distribution of the bearing pressure.

Another object of this invention is to provide a bearing of the type characterized which is simple in construction, easy to standardize, inexpensive to manufacture, and highly efficient in operation.

Other objects will appear as the description of the invention proceeds.

The invention is capable of receiving a variety of mechanical expressions, two of which are illustrated on the accompanying drawings, but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures, and wherein the invention is illustrated somewhat schematically to facilitate understanding thereof—

Fig. 3 is a plan view of a bearing shoe embodying the present invention in a somewhat different form;

Fig. 4 is a cross section of Fig. 3 on the line 4—4 thereof; and

Fig. 5 is a cross section of Fig. 3 on the line 5—5 thereof.

Figures 1, 2:
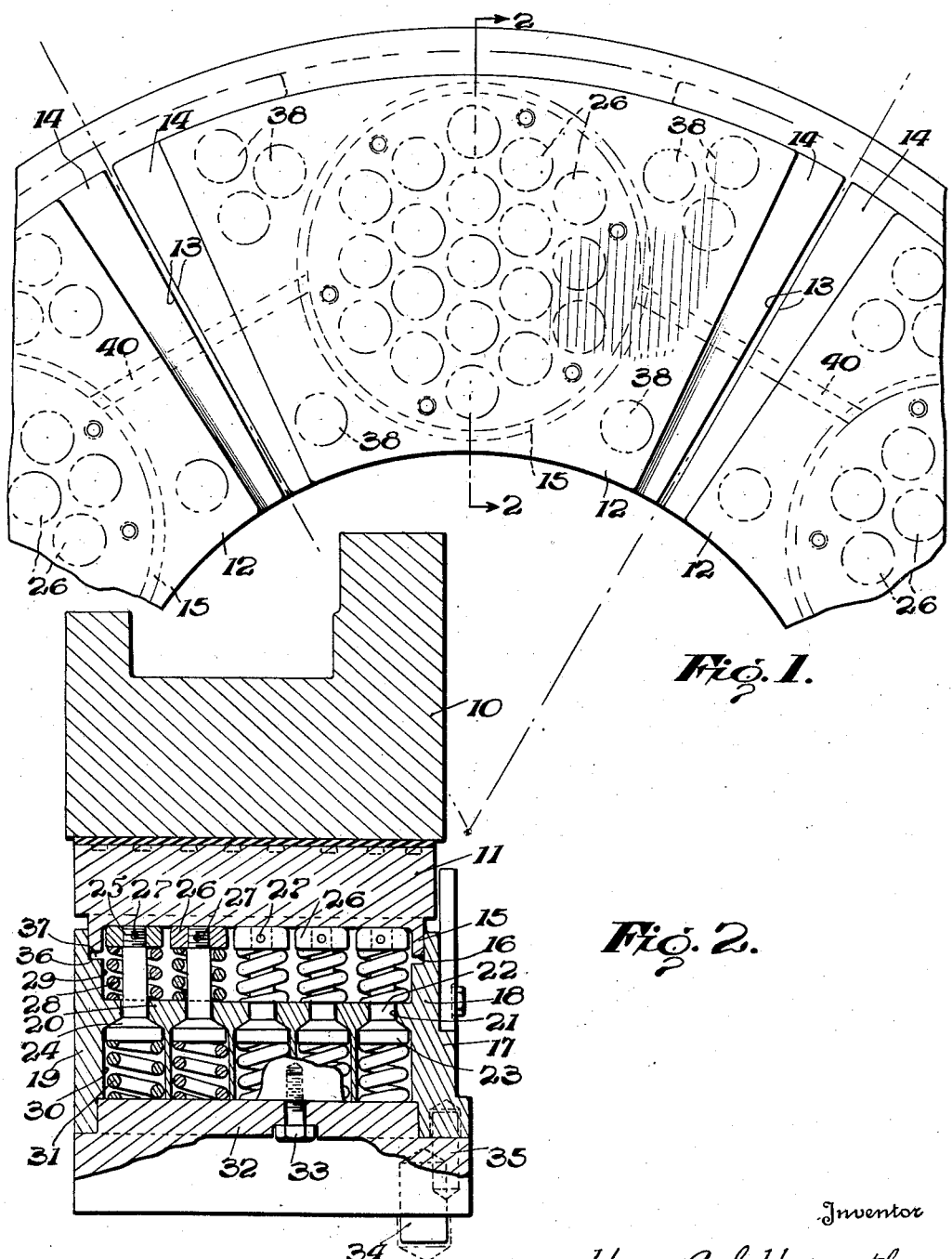
Fig. 1 is a fragmentary plan view of a thrust bearing embodying the present invention.
Fig. 2 is a cross section taken on the line 2—2 of Fig. 1.

In the form shown in Figs. 1 and 2, 10 is a thrust element of any suitable form and construction with which cooperates a stationary bearing member 11. Said stationary bearing member may be a rigid, flexible or semi-flexible member of either continuous or semi-continuous construction, or it may be composed of separate or flexibly connected rigid portions, as segments of an annulus, individually supported shoes, and the like. As illustrated, the stationary bearing member is composed of a plurality of shoes 12 shown as having closely spaced lateral edges 13 and beveled, channeled, or otherwise suitably formed adjacent the lateral edges so as to provide passages 14 through which the lubricating oil may flow radially with respect to the bearing surfaces thereof to supply lubricant to the leading edges of said surfaces as required for the establishment and maintenance of the desired wedge-shaped oil films between the opposed and cooperating bearing surfaces on the relatively rotatable members 10 and 11.

As shown, each shoe is provided at the rear face thereof with an axially extending rib or flange 15 which is preferably circular in outline, and which may be symmetrically disposed with respect to the bearing surface of the shoe or otherwise suitably arranged. Said flange 15 cooperates with a corresponding recess 16 formed in the supporting element 17, and said element 17 may conveniently take the form of inner and outer circumferentially extending walls 18 and 19 joined by a transverse partition 20, which may be integral therewith or suitably attached thereto, whereby a common support or abutment is provided for two or more shoes and their associated elastic means. The inner wall of recess 16 has a small clearance from the peripheral wall of flange 15 so that the two cooperate as the relatively stationary and movable elements of a dashpot.

Partition 20 is provided with a plurality of apertures 21 through which extend pins 22 here shown as having their extremities remote from the shoe enlarged to form heads 23 with frusto-conical surfaces 24 connecting the same to the shanks of said pins. The opposite extremities of said pins are threaded as shown at 25 and mounted thereon are nuts 26 which may be adjusted with respect to said pins, owing to the threaded connection therebetween, and then locked against relative movement in any suitable way as by cotter pins 27. Interposed between each nut 26 and the opposed face of the partition 20 is a coil spring 28. The space between the partition 20 and the shoe 12 may be formed as a common chamber 29 for the several pins 22 with their nuts 26 and springs 28 or, if preferred, as pointed out in connection with the embodiments of Figs. 3 to 5, said space may be subdivided into cells one for each of the said springs. Where the shoe is to operate as the movable member of a dashpot, as illustrated, however, said space, at least adjacent that portion thereof which is contiguous to the rear of the shoe is formed as a single chamber common to all of the pins with their nuts and springs.

At the opposite side of the wall 20, as here shown, member 17 has as many cells 30 as there are pins 22, said cells being of such size as to freely receive the heads 23, and the ends of said cells in the direction of the shoe being preferably provided with frusto-conical annular surfaces mating with the surfaces 24 on the pins 22 so as to provide seats therefor. Disposed in each of said cells 30 is a coil spring 31 reacting between the head 23 and a common abutment plate 32 which closes all of said cells and which is attached to the body of member 17 in any suitable way as by one or more screws 33. If preferred, however, a common chamber may be provided for all of the springs 31, analogously as in the case of the common chamber 29 for the springs 28, provided suitable means are also supplied for preventing lateral displacement of the springs 31 with respect to the heads 23.

The entire structure comprising the supporting element 17 with its inner and outer arcuate walls 18 and 19, its abutment plate 32 and the pins and springs mounted therein preferably constitutes a unit of segmental, semi-annular or annular form that can be assembled outside of the bearing and then mounted in any suitable way on the base of the bearing structure, relative rotation being prevented by suitable dowels 34, additional dowels 35 being preferably interposed between one or both of the inner and outer walls 18 and 19 and the abutment plate 32. Separate units, one for each shoe, may be provided of the construction just described, but it is preferred that the unit just described be made of a size sufficient to provide a support for two or more shoes.

In this embodiment of the invention one or both of the sets of springs 28 and 31 are preferably precompressed. Thus by adjusting the nuts 26 on the threaded extremities of pins 22 the springs 28 may be given a predetermined degree of precompression, and similarly, if desired, the springs 31 may be of such free length that when the thrust plate 32 is in position the springs 31 are given a predetermined degree of precompression between the heads 23 and the inner face of the abutment plate 32. Thus when the bearing is assembled each shoe 12 rests at its rear face upon the plurality of nuts 26, said nuts being held in their uppermost position as shown on the drawings, as viewed in Fig. 2, by the precompressed springs 28, with the conical faces 24 of the heads 23 seated against the mating surfaces at the extremities of the cells 30, said heads 23 being also held in such seated position by the reaction of the springs 31 between said heads and the abutment plate 32. Each of said springs 28 and 31 is yieldable to the extent required for the shoe supported thereby to take up that position which is suitable for the equitable distribution of the load, both as respects distribution of the load between the several shoes 12 and as respects distribution of the load over the surface of each shoe, whereby in conformity with the principles of the Kingsbury bearing the bearing member or members may tilt both radially and circumferentially to maintain proper bearing films between the surfaces of the opposed relatively rotatable bearing members and also to maintain the proper distribution of load or bearing pressure over the several bearing members. As each pin 22 is in cooperative relationship with and is movable against the elastic resistance of a plurality of springs, the capacity of the elastic support, as will now be apparent, has been greatly increased. At the same time, as the springs of one or both of said sets 28 and 31 are under initial compression, and also restrained in so far as expansion is permitted in the direction of the shoe, said springs will not be set into undue vibration.

To prevent an undue displacement of the shoe in the direction of compression of said springs, the dashpot provided by the elements 15 and 16 is preferably so constructed as to provide a positive stop for the movement of the shoe in an inward direction. As shown, the recess 16 is of larger diameter than the chamber 29 so as to provide an inwardly extending ledge 36 which is spaced from the inner extremity of the flange 15 by a predetermined clearance 37 when the parts are in normal loaded relationship. Clearance 37 determines the extent to which the shoe 11 may be moved downwardly as viewed in Fig. 2 before the ledge 36 is engaged by flange 15 to provide a positive stop. Thus the possible extent of axial displacement of the shoe 12 with respect to its support or abutment is limited in a downward direction as viewed in Fig. 2 by the engagement of the flange 15 with the ledge 36, while upward movement of said shoe as viewed in said figure is restricted by the engagement of the conical surfaces 24 on heads 23 with the seats provided at the bottom of the cells 30.

As shown in Fig. 1 the shoe 12 may have, in addition to the spring support within the flange 15, a plurality of springs 38 coacting with the rear face of the shoe at the corner portions thereof, although if preferred the entire elastic support may be concentrated within the confines of the flange 15. When springs 38 are used they may be either single springs or they may be springs in axially arranged pairs of the same character as shown in Fig. 2. While two springs have been shown as associated with each pin 22, it is also apparent that if for any reason it is desired to provide a second bank of springs 31 which increases the elastic resistance to displacement of the shoe over less than the entire bank of springs 28, springs may be omitted from the bank 31 to obtain the desired distribution of elastic resistance to displacement therein. It will also be apparent that if for any reason the elastic capacity of the resilient support of the shoes is desired to be still further increased, additional tiers or banks of springs may be provided. Also, if preferred, each pin may coact with a plurality of springs in one or both tiers or banks, i. e., concentric springs, for example, may cooperate with the nuts 26 with or without concentric springs in the cells 30, etc.

Where the rear of the shoe and its supporting member are constructed so as to provide the elements of a dashpot, it is preferred to connect the several dashpots together in the manner disclosed in the aforesaid patent to Albert Kingsbury, No. 1,754,324. Thus as schematically illustrated in Fig. 1, the chambers 29 of the several shoe supports may be interconnected by passages 40, formed in any suitable way and opening into the chambers 29, so that, for example, if the rotatable bearing member should be running out of true or have a high spot on its bearing surface, the progressive compression of the springs supporting the several shoes, as the high spot progresses from shoe to shoe during each rotation, will not tend to set the springs into vibration, but cause the oil displaced by each depression of a shoe with respect to its support or abutment to flow into the next chamber 29, as explained in detail in said Kingsbury patent.

In the embodiment of Figs. 3, 4 and 5 each shoe 12 is shown as mounted on a plurality of pins 41 which extend through apertures 42 of partition 43, with suitable clearance, each of said pins at the opposite side of the partition 43 from the shoe 12 being provided with an enlargement or flange 44. Surrounding each pin at the rear of the shoe and reacting between the rear face of the shoe and the opposed face of the partition 43 is a coil spring 45, and also reacting between each enlargement or flange 44 and the inner face of an abutment plate or wall 46 is a second coil spring 47. Each of the springs 45 and 47 may be disposed in a cylindrical socket or cell suitably provided in the body of the supporting structure 48, or centering cylindrical walls 49 and 50 may be disposed in the chambers at the opposite sides of the partition 43 and either formed thereon or attached thereto, or said centering walls may be otherwise suitably mounted to prevent lateral displacement. Each pin 41 is of such length that when the parts are assembled as shown in Figs. 4 and 5 the ends of the pin makes a predetermined clearance 51 from the face of the abutment plate or wall 46. Hence as in the embodiment of Figs. 1 and 2 displacement of the pins 41 in an axial direction is confined within predetermined limits, because downward movement of said pins, as viewed in Figs. 4 and 5, is limited by the engagement of the ends of said pins with the inner face of the abutment plate or wall 46, while upward movement of said pins, as viewed in said figures, is limited by the engagement of the enlargements or flanges 44 with the adjacent face of the partition 43.

In this embodiment as illustrated the springs are not in a precompressed state, and as shown the shoes 12 do not cooperate with the mounting means to constitute a dashpot, as in the embodiment of Figs. 1 and 2. Otherwise, the embodiment of Figs. 3, 4 and 5 functions in the manner as heretofore described, and as in the case of the embodiment of Figs. 1 and 2, additional banks of springs may be provided if desired, springs may be omitted from the second bank to obtain a predetermined distribution of elastic resistance to displacement, a plurality of springs, as concentric springs, may be arranged for cooperation with each pin in one or both banks, etc.

It will therefore be perceived that by the present invention the capacity of the elastic support for the stationary bearing member, whether it be composed of a complete annulus of a rigid, flexible, or semi-flexible construction, or whether it be composed of separate segments or shoes either unconnected or flexibly connected, has been greatly increased, 100 per cent where a complete second bank of springs is used as illustrated although a greater or less increase of capacity may be obtained depending upon the number and strength of the springs in the second bank of springs. It will also be perceived that this increase of capacity of the elastic support has been effected without danger of undue displacement of the elastically supported bearing member, and without danger of vibratory or other undesirable movements of the elastically supported bearing member, because provision has been made whereby movement of the stationary bearing member in either direction may be positively limited while the springs may be precompressed to increase their resistance to undesired displacement, and when the elements cooperate as dashpots the dashpots may be interrelated so as to minimize the effect of periodically recurring displacements. Thus the increase in capacity of the elastic support is obtained with the cooperation of means for dampening or preventing vibratory or other undesirable displacements of the stationary bearing member or members.

While the embodiments of the invention illustrated on the drawings have been described with considerable particularity, it is to be expressly understood that the invention is not restricted thereto, as the same may receive a variety of mechanical expressions, as will now be apparent to those skilled in the art, while certain features may be used without other features, and changes may be made in the details of construction, arrangement and proportion of parts without departing from the spirit of the invention. Reference is therefore to be had to the appended claims for a definition of said invention.

What is claimed is:

1. In a bearing, in combination with relatively rotatable bearing members, means for elastically sustaining the bearing pressure thereon including a plurality of sets of elastic means separately arranged in the direction of the load and means for simultaneously transmitting pressure to each of said elastic means whereby the load is borne elastically by all of said elastic means acting simultaneously.

2. In a bearing, in combination with relatively rotatable bearing members, means for elastically sustaining the bearing pressure thereon including a plurality of springs cooperating with one of said bearing members and adapted to yield to effect distribution of the bearing pressure over the surface thereof, a second set of springs separately arranged in the direction of load with respect to said first set of springs, and means movable with said bearing member upon compression of the springs of said first set to effect compression of the springs of said second set whereby said bearing member is resiliently sustained by said sets of springs.

3. In a bearing, in combination with relatively rotatable bearing members, means for elastically sustaining the bearing pressure thereon including a plurality of springs cooperating with one of said bearing members, supporting means for said springs, pins provided with means between which and said supporting means said springs react and to which the load on said bearing member is transmitted, a second set of springs, supporting means therefor, and means on said pins between which and said last named supporting means the springs of said second set react.

4. In a bearing, in combination with relatively rotatable bearing members, means for elastically sustaining the bearing pressure thereon including a plurality of springs cooperating with one of said bearing members, supporting means for said springs between which and said bearing member said springs are disposed, a second set of springs separately arranged in the direction of load with respect to said first named springs, supporting means for said last named springs, and means for transmitting load to the springs of said second set when the springs of said first set yield under movement of said bearing member.

5. In a bearing, in combination with relatively rotatable bearing members, means for elastically sustaining the bearing pressure thereon including a plurality of sets of springs separately arranged in the direction of load, means constituting abutments for the springs of each set, and means for simultaneously transmitting the load on one of said bearing members to the springs of each set, said last named means including pins provided with means cooperating with the springs of each set.

6. In a bearing, in combination with relatively rotatable bearing members, means for elastically sustaining the bearing pressure thereon including a plurality of sets of springs separately arranged in the direction of load, supporting means constituting abutments for the springs of each set, and means for simultaneously transmitting the load on one of said bearing members to the springs of each set, at least one set of said springs being retained under an initial compression between said means and said abutment.

7. In a bearing, in combination with relatively rotatable bearing members, means for elastically sustaining the bearing pressure thereon including a plurality of sets of springs separately arranged in the direction of load, supporting means constituting abutments for the springs of each set, means for simultaneously transmitting the load on one of said bearing members to the springs of each set, and means for limiting the compression of said springs.

8. In a bearing, in combination with relatively rotatable bearing members, means for elastically sustaining the bearing pressure thereon including a plurality of sets of springs separately arranged in the direction of load, supporting means constituting abutments for the springs of each set, and pins for simultaneously transmitting the load on one of said bearing members to the springs of each set, said pins cooperating with said abutment means for preventing excessive compression of said springs.

9. In a bearing, in combination with relatively rotatable bearing members, means for elastically sustaining the bearing pressure thereon including a plurality of sets of springs separately arranged in the direction of load, supporting means constituting abutments for the springs of each set, and means for simultaneously transmitting the load on one of said bearing members to the springs of each set, said bearing member and said supporting means being provided with means which cooperate to provide a dashpot upon the yielding of said springs.

10. In a bearing, in combination with relatively rotatable bearing members including a plurality of shoes or segments, means for equitably distributing the pressure on said shoes or segments including a plurality of sets of elastic means separately arranged in the direction of load for supporting each of said shoes or segments, and means for transmitting the load simultaneously to each of the elastic means associated with each shoe or segment.

HARRY A. S. HOWARTH.